Dec. 11, 1934.   C. B. MORRISH ET AL   1,984,148
LUBRICATING MECHANISM
Filed Dec. 2, 1932   2 Sheets-Sheet 1

Inventor
Charles B. Morrish & William H. Rex, Jr.
Charles M. Lindrooth
Attorney

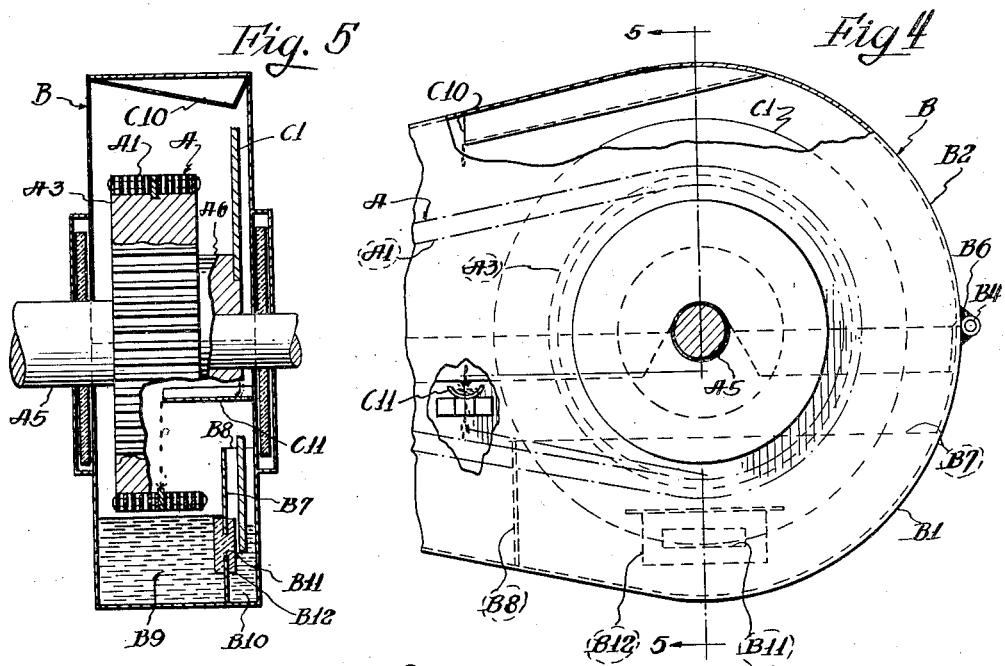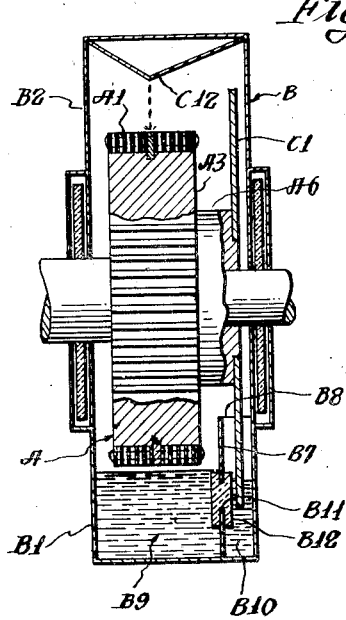

Patented Dec. 11, 1934

1,984,148

UNITED STATES PATENT OFFICE 1,984,148

LUBRICATING MECHANISM

Charles B. Morrish, Philadelphia, and William H. Rex, Jr., Willow Grove, Pa., assignors to Link-Belt Company, Chicago, Ill., a corporation of Illinois Application December 2, 1932, Serial No. 645,382

16 Claims. (Cl. 184—15)

This invention relates to improvements in lubricating mechanisms and more particularly to a new and improved means for lubricating a power transmission device including a means for regulating the flow of lubricant to the same.

Power transmission devices, such as chain drives, have heretofore been enclosed in casings of an oil and dust tight construction and lubricated by running the power transmission device in oil in the bottom of the casing. Such a means is effective for lubricating the chain, but causes excessive heating of the oil and chain drive and also requires more oil than is necessary to lubricate the drive with the result that the oil is wasted and may leak out of the casing, which last mentioned feature is objectionable, particularly where the oil is liable to drip on the floor or adjacent machinery or materials on which the machine is working.

Another method of lubricating power transmission devices, such as chain drives, is to immerse a rotatable disk into an oil reservoir which is usually the lower portion of the casing for the drive and collect the oil thrown centrifugally from the disk and drip it onto the chain. While such a lubricating device cuts down heating of the oil to a certain extent, it still has some of the disadvantages of the first mentioned method of lubricating chain drives in that the amount of oil fed to the disk cannot be controlled and is excessive at times.

The device of our invention is so constructed as to overcome these difficulties and has, as its principal objects, to provide a new and improved means for lubricating power transmission devices, such as chain drives, constructed with a view towards minimizing churning and heating of the lubricant and also regulating the flow of lubricant to the moving parts in such a manner that said parts will automatically be supplied with an increased flow of lubricant when necessary, which flow will decrease when the need therefor decreases, which mechanism will in turn prevent continuous flooding of the parts and leakage of the lubricant from the casing, together with a casing which will afford ventilation of the power transmission device.

Other objects of our invention will appear from time to time as the following description thereof proceeds.

Our invention may be more clearly understood with reference to the accompanying drawings wherein:

Figure 4 is a partial fragmentary side elevation of a modified form of our invention with parts broken away and in section to more clearly show the details thereof;

Figure 5 is a partial fragmentary vertical sectional view taken substantially along line 5—5 of Figure 4; and Figure 6 is a detailed view of another modified form of our invention.

Like reference characters refer to like parts throughout the several figures.

Figure 1:
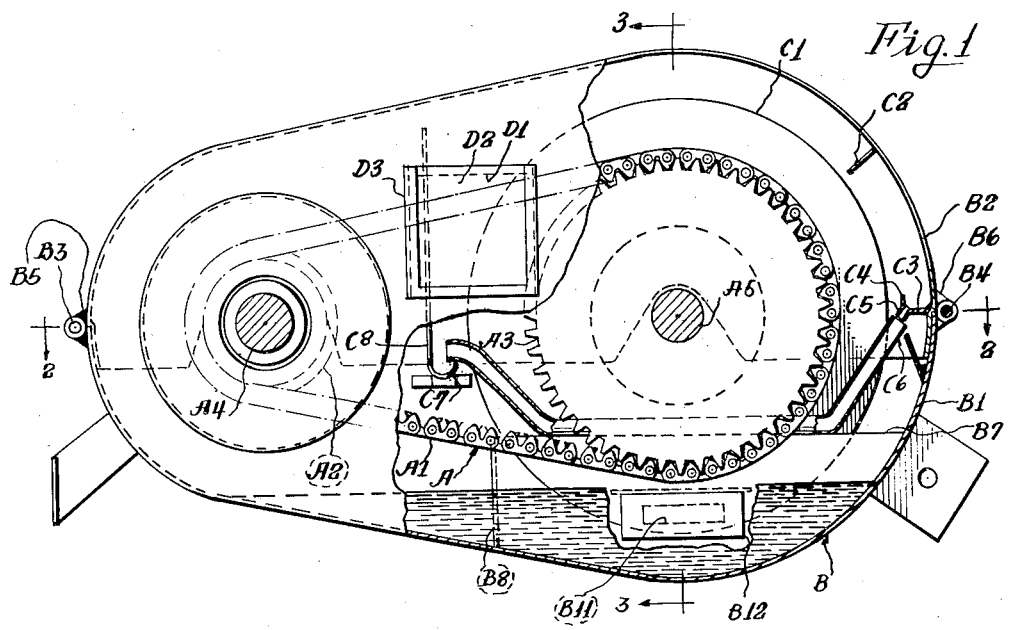
Figure 1 is a side elevation of one embodiment of our invention with parts broken away and in section to more clearly show the details thereof.

Referring now in detail to the drawings, the embodiment of our invention illustrated comprises a power transmission device generally indicated by reference character A. The power transmission device A may be of any type well known to those skilled in the art but is herein preferably shown as being a chain type of power transmission device comprising an endless chain A—1 mounted on sprocket wheels A—2 and A—3, which sprocket wheels are carried on shafts A—4 and A—5, respectively, in a usual manner. While the drive chain A—1 and sprockets A—2 and A—3 may be of any well known type, the type herein preferably shown is of the well known silent chain type.

The power transmission device A is housed in a casing, generally indicated by reference character B, which comprises a lower half B—1 and an upper half B—2 hinged thereto on removable hinge pins B—3 and B—4 at opposite ends thereof. The hinge pin B—3 passes through suitable hinge members B—5 secured to the upper and lower halves B—2 and B—1, respectively, of the casing B while the hinge pin B—4 similarly passes through suitable hinge members B—6 secured to said upper and lower halves of said casing at the opposite end thereof from the hinge pin B—3. Thus when either of the hinge pins B—3 or B—4 are removed from their respective hinge members B—5 or B—6, the casing B may be opened about the opposite hinge pin, permitting ready accessibility to the parts within said casing, said pins acting as a means for locking said casing in a closed position in an obvious manner. Suitable means are provided to prevent leakage of oil from the casing B around the holes for the shafts A—4 and A—5, which means may be of an ordinary construction so will not herein be described in detail.

Referring now in particular to several of the novel features of our invention, the lower portion of the casing B serves as a storage reservoir for a lubricant, such as oil, for lubricating the transmission device A and a chamber for feeding oil to the lubricating mechanism and is divided by a longitudinally extending dividing member B—7 having a laterally extending rearward wall B—8 extending from said dividing member to one side of said casing into a lubricant storage compartment B—9 and a lubricant feeding compartment B—10.

The longitudinally extending dividing member B—7 is provided with a passageway or aperture B—11 extending therethrough. The aperture B—11 is located in the lower half of the longitudinally extending dividing number B—7 and serves as a means for regulating the flow of lubricant from the storage compartment B—9 to the feeding compartment B—10. While the aperture B—11 may be of a small size and permit the oil to seep therethrough from the storage compartment B—9 to the feeding compartment B—10 at the required rate and thus regulate the flow of lubricant between said storage and lubricating compartments, the means for regulating the flow of oil between said compartments is herein preferably shown as being an oil filtering means indicated by reference character B—12. The oil filtering means B—12 may be a wick or any suitable oil filtering medium and is herein preferably shown as being a felt filter of an ordinary type. The filter B—12 is compressed so as to register with and pass through the passageway or aperture B—11 of the dividing member B—7 and extend on opposite sides of said dividing member.

It should be understood that the level of the oil in the storage compartment B—9 is always below the drive chain A—1 a distance sufficient to preclude any possibility of said drive chain being immersed in and churning up the oil in said storage compartment, oil being drained from or added to the casing B, and maintained at the proper level by means of suitable drain and filling plugs and a suitable oil gauge if desired (not shown) in a usual manner.

It is thus apparent that when the lubricating mechanism is inoperative, oil will seep through the aperture B—11 and filter B—12 until the oil level in both the storage and feeding compartments B—9 and B—10 is the same, and that as the lubricating mechanism is operating, the level of the oil in said feeding compartment will drop beneath the oil level in said lubricant storage compartment due to the fact that oil is initially taken from the lubricating compartment B—10 at a faster rate than it is fed therein by the filter B—12, oil subsequently being taken from said compartment at the same rate it is fed therein, the advantages of which arrangement will hereinafter more fully appear.

With reference now in particular to the means for lubricating the power transmission device A and several other novel features of our invention, a disk C—1 is provided. The disk C—1 may be secured either to the shaft A—5 or the sprocket A—3 but is herein preferably shown as being secured to a hub A—6 of the sprocket A—3 in a usual manner. It is, of course, obvious that the casing B may be so arranged that the disk C—1 may be secured to either the sprocket A—2 or shaft A—4 if desired. The disk C—1 is of larger diameter than its associated sprocket A—3 and extends into and is adapted to dip into the oil in the feeding compartment B—10 for picking up said oil and centrifugally throwing said oil to suitable oil collecting means from where it is led to the drive chain A—1.

A deflector C—2 is secured to the inner periphery of the upper half B—2 of the casing B in a suitable manner. The deflector C—2 is disposed a substantial distance above the shaft A—5 but beneath the top of the disk C—1 and extends radially inwardly therefrom to a position adjacent the outer periphery of said disk. An oil pocket C—3 is secured to the inner periphery of the upper half B—2 of the casing B and extends inwardly therefrom towards the disk C—1 and across the inner side of said casing. The oil pocket C—3 is provided with an upwardly extending lip C—4 adjacent its inner end and a depending spout C—5 which leads to a suitable oil conducting member, such as a conduit C—6. The conduit C—6 is secured to the upper edge of the dividing member B—7 in a suitable manner and extends from the spout C—5 to a conducting member C—7 adjacent the opposite end of the disk C—1. As herein shown the conduit C—6 is disposed on the inner side of the disk C—1 and extends angularly downwardly and rearwardly from the spout C—5 to and along the dividing member B—7 and then angularly upwardly and rearwardly to the oil conducting member C—7 and its end adjacent said oil conducting member is of a lower elevation than its end adjacent said spout. The oil conducting member C—7 is of a troughlike construction and extends laterally from the inner side of the casing B inwardly to a position adjacent the inside center of the lower strand of the drive chain A—1 for discharging oil thereon. The oil conducting member C—7 is secured to the lower half B—1 of the casing B and has an oil collecting member C—8 formed integral therewith and extending upwardly therefrom.

When the disk C—1 is running in a counterclockwise direction, oil thrown centrifugally thereby will be caught on the inner periphery of the upper half B—2 of the casing B between the oil pocket C—3 and deflector C—2. Oil so collected will run down the underside of the casing B between these aforementioned points to the oil pocket C—3 and through the spout C—5 into the conduit C—6.

Due to the fact that the end of the conduit C—6 adjacent the oil pocket C—3 is of a greater elevation than the opposite end of said conduit adjacent the conductor C—7, oil flowing through the spout C—5 into said conduit will force the oil in said conduit to discharge from the lower end thereof into said conductor and to the inside of the lower strand of the drive chain A—1.

Any oil thrown from the disk C—1 to the inner periphery of the casing B between the deflector C—2 and a point on the opposite side of said disk from said deflector but forwardly of the collector C—8 will run down the inner side of said casing into the feeding compartment B—10, while oil thrown beyond said point in the same direction will be collected by the oil collecting member C—8 and delivered to the conductor C—7.

When the disk C—1 is running in an opposite direction, oil thrown centrifugally therefrom is collected by the collecting member C—8, said oil running down said collecting member to the conductor C—7 and from thence to the inner side of the lower strand of the drive chain A—1 and oil thrown beyond said collecting member will run down the sides of the casing or outer side of the deflector C—2 into the feeding compartment B—10.

As has before been stated, when the drive is idle the level of the oil in the compartments B—9 and B—10 is the same. Thus a large quantity of oil is supplied to the disk C—1 upon starting the drive giving the drive chain A—1 a good bath of oil and thoroughly lubricating said chain. After the drive is in operation and the chain is thoroughly lubricated, the need for such a large flow of lubricant decreases and the depth of oil in the feeding compartment B—10 in which the disk C—1 penetrates is automatically lowered, inasmuch as less oil is fed to the feeding compartment B—10 through the filter B—12 than is initially picked up by said disk, but as the level of the oil in the lubricant feeding chamber B—10 is lowered said disk picks up an amount of oil equal to the amount of oil fed by said filter. It is, of course, apparent that various types or grades of filters may be used for regulating the feeding of a greater or lesser quantity of oil to the disk C—1 for varying conditions of service of the transmission device A.

It may thus be seen that a lubricating means for a transmission device has been provided which is so arranged that the flow of oil is automatically regulated so it may vary as the need therefor varies, which arrangement permits the transmission device to be given a thorough oil bath when starting and prevents wasting of the oil and leakage from the casing and thus provides a drive and lubricating mechanism which minimizes the tendency for the oil to be thrown about the casing while the drive is in operation.

It has been found that with a lubricating mechanism constructed in accordance with our invention, that after the transmission device has been thoroughly lubricated when starting, that the parts are amply lubricated by means of dropping a few drops of oil on the inside of the chain every few seconds and that inasmuch as the oil thrown centrifugally by the disk C—1 is collected in the aforementioned manner so as not to be promiscuously thrown about the casing, and inasmuch as the parts of the chain drive do not churn the oil or are not excessively lubricated, the casing B may be opened for inspection or ventilation while the drive is running without any danger of oil being thrown from the opening.

Suitable means are provided for inspecting and ventilating the transmission device A while running which, as herein shown, comprises an opening D—1 formed in the upper half B—2 of the casing B, which opening is adapted to be closed by a suitable inspection door D—2 slidable in and engaged by suitable guides, generally indicated by reference character D—3, in a usual manner.

Where the transmission device is operating in a dusty atmosphere, the opening D—1 may be covered by means of a suitable screen of a fine mesh to prevent dust from entering the casing.

Figure 2:
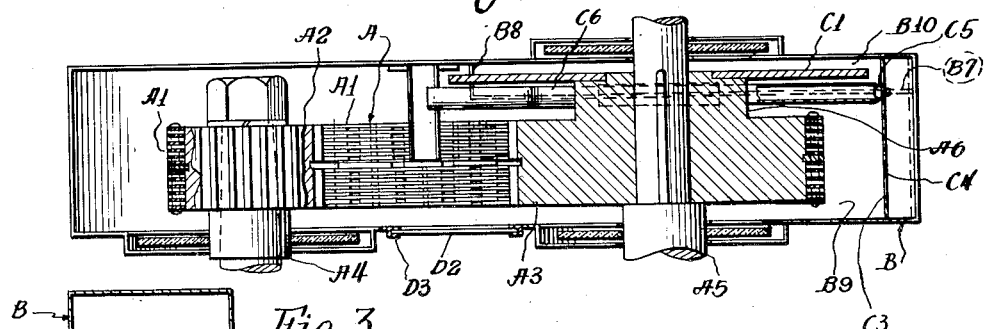
Figure 2 is a horizontal cross-sectional view taken substantially along line 2—2 of Figure 1.
Figure 3:
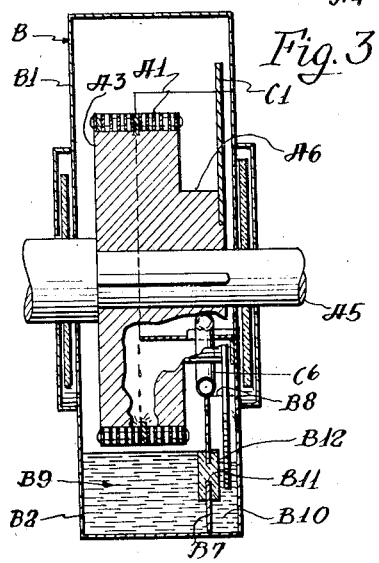
Figure 3 is a vertical sectional view taken substantially along lines 3—3 of Figure 1.

Referring now in particular to Figures 4, 5, and 6, and several modified forms of our invention, the same type of revolving disk, drive mechanism, and means for regulating the amount of lubricant in which the disk revolves are provided as has been hereinbefore described with respect to Figures 1, 2, and 3, so the same reference characters will be applied to these parts as were applied to Figures 1, 2, and 3.

In the device shown in Figures 4 and 5, the oil thrown centrifugally from the disk C—1 is collected on a V shaped drip plate C—10 disposed above the disk C—1 and so arranged that the point of the V is above said disk. The V shaped drip plate C—10 extends rearwardly from the disk C—1 beyond said disk, and a conducting member C—11 is disposed beneath and in alignment with the rearward end of said drip plate between the upper and lower strands of the chain so that oil dripping thereon from the V shaped drip plate C—10 will be conducted to the lower strand of the chain.

In Figure 6, a V shaped drip plate C—12 is disposed above the disk C—1 and is so arranged that the point of the V is substantially in alignment with the center of the drive chain A—1. Here oil collected on the sides of the V shaped drip plate C—12 will run down the underside thereof to the point of the V where it will drip onto the top side of the drive chain A—1 and lubricate said chain.

While we have herein shown and described several forms in which our invention may be embodied, it will be understood that the construction and arrangement of the various parts may be altered or changed without departing from the spirit and scope thereof. Furthermore, we do not wish to be construed as limiting ourselves to the particular forms illustrated, excepting as they may be limited in the appended claims.

We claim as our invention:

1. In a power transmission device including a pair of shafts having sprockets thereon and having an endless chain threaded about said sprockets, a casing for said chain and sprockets including a lower half having an oil storage compartment in its bottom in alignment with and beneath said chain and sprockets and a lubricating compartment to one side thereof, an oil conductor secured to the lower half of said casing and leading to the inside of the lower strand of the chain and a disk on one of said shafts dipping into said lubricating compartment, a passageway between said compartments having an oil filtering member therein for regulating the extent to which said disk dips into the oil, and means cooperating with said disk for transmitting oil onto said conductor including an upper half of said casing detachably secured to said lower half and having means carried thereby for collecting the oil and transmitting it onto said conductor.

2. In an apparatus of the class described, a pair of shafts having sprockets thereon, a chain running on said sprockets, a casing enclosing said chain and sprockets including an upper and lower portion, said portions being detachable with respect to each other, an oil reservoir formed in the lower portion of said casing, a lubricating compartment disposed to one side of said oil reservoir, a passageway between said compartments, a disk on said shaft extending into said lubricating compartment, and means for collecting the oil thrown by said disk and depositing it on the inside of the lower strand of said chain and restricting the amount of oil thrown about said casing comprising means in said passageway for regulating the flow of oil from said reservoir to said lubricating compartment and means on the inside of said casing for collecting the oil thrown centrifugally by said disk and conducting it to the inside of the lower strand of said chain.

3. In a device of the class described, a pair of shafts having sprockets thereon, a chain running on said sprockets, a casing for said chain and sprockets, a disk on one of said shafts, means cooperating with the inside of said casing for catching oil thrown centrifugally from said disk and discharging it on the inner periphery of the lower strand of said chain, and means for filtering and regulating the flow of oil to said disk comprising a dividing member extending along the lower portion of said casing and dividing said casing into a storage compartment beneath and in alignment with said chain and sprocket drive, and a lubricating compartment into which said disk extends to one side of said chain and sprocket drive, and a passageway in said dividing member an oil filtering member carried therein, said passageway being spaced above the bottom of said casing.

4. In a lubricating device for chain drives, a pair of shafts having sprockets thereon, a chain running on said sprockets, a casing for said chain and sprockets including a lower half, the bottom portion of which is divided into an oil storage compartment extending longitudinally of said casing and in alignment with said chain and sprockets and having an oil level beneath the lowermost portion of said chain, and a lubricating compartment of smaller capacity than said storage compartment and disposed to one side of said chain and sprockets, a disk on one of said shafts extending into said lubricating compartment, a passageway between said compartments having an oil filtering member therein for regulating the passage of oil from said storage to lubricating compartments and the extent to which said disk is dipped into the oil, a conductor in said lower half leading to the inside of the lower strand of the chain, and means for collecting the oil thrown by said disk and transmitting it to said conductor at a regulated rate comprising an upper half of said casing detachably secured to said lower half and means on the inside of the upper half of said casing for limiting the extent to which oil is thrown about said casing.

5. In a lubricating device for chain drives, a pair of shafts having sprockets thereon, a chain running on said sprockets, a casing for said chain and sprockets including a lower half, the bottom portion of which is divided into an oil storage compartment extending longitudinally of said casing and in alignment with said chain and sprockets and having an oil level beneath the lowermost portion of said chain, and a lubricating compartment of smaller capacity than said storage compartment and disposed to one side of said chain and sprockets, a disk on one of said shafts extending into said lubricating compartment, a passageway between said compartments having an oil filtering member therein for regulating the passage of oil from said storage to lubricating compartments and the extent to which said disk is dipped into the oil, a conductor in said lower half leading to the inside of the lower strand of the chain, and means for collecting the oil thrown by said disk and transmitting it to said conductor at a regulated rate comprising an upper half of said casing detachably secured to said lower half and means on the inside of the upper half of said casing for limiting the extent to which oil is thrown about said casing comprising a radial deflecting member extending to a point closely adjacent said disk.

6. In a lubricating device for chain drives, a pair of shafts having sprockets thereon, a chain running on said sprockets, a casing for said chain and sprockets including a lower half, the bottom portion of which is divided into an oil storage compartment extending longitudinally of said casing and in alignment with said chain and sprockets and having an oil level beneath the lowermost portion of said chain, and a lubricating compartment of smaller capacity than said storage compartment and disposed to one side of said chain and sprockets, a disk on one of said shafts extending into said lubricating compartment, a conductor in said lower half leading to the inside of the lower strand of the chain, means for restricting the amount of oil fed to said lubricating compartment when the device is running comprising a passageway between said compartments having an oil filtering member therein, means for collecting the oil thrown by said disk and transmitting it to said conductor at a regulated rate comprising an upper half of said casing having an opening therein adapted to permit inspection and ventilation of the chain and sprocket drive, and means on the inside of said upper half of said casing for limiting the extent to which oil is thrown about said casing to such a degree as to preclude oil from being discharged through said opening.

7. In a lubricating device for chain drives, a pair of shafts having sprockets thereon, a chain running on said sprockets, a casing for said chain and sprockets including a lower half, the bottom portion of which is divided into an oil storage compartment extending longitudinally of said casing and in alignment with said chain and sprockets and having an oil level beneath the lowermost portion of said chain, and a lubricating compartment of smaller capacity than said storage compartment and disposed to one side of said chain and sprockets, a disk on one of said shafts extending into said lubricating compartment, a conductor in said lower half leading to the inside of the lower strand of the chain, means for restricting the amount of oil fed to said lubricating compartment when the device is running comprising a passageway between said compartments having an oil filtering member therein, means for collecting the oil thrown by said disk and transmitting it to said conductor at a regulated rate comprising an upper half of said casing having an opening therein adapted to permit inspection and ventilation of the chain and sprocket drive, and means on the inside of said upper half of said casing for limiting the extent to which oil is thrown about said casing to such a degree as to preclude oil from being discharged through said opening comprising a radial deflecting member extending to a point closely adjacent said disk.

8. In a transmission device and in combination with a chain runing on a pair of sprockets, a casing for said chain and sprockets comprising a lower portion and an upper portion detachably secured thereto and forming a closure member for said casing, an opening in one of the sides of the upper portion of said casing adapted to permit inspection and ventilation of the chain drive while running, means for lubricating said chain comprising a disk dipping into oil in the lower portion of said casing and means for regulating the extent to which said disk dips into the oil and restricting the amount of oil thrown about said casing in such a manner that said chain may be amply lubricated without throwing oil from said opening, comprising a dividing member dividing said casing into an oil storage compartment beneath said chain and sprocket drive and a separate lubricating compartment to one side thereof in alignment with said disk, and a passageway in said dividing member between said compartments having an oil filtering member therein.

9. In an apparatus of the class described, a pair of shafts having sprockets thereon, a chain running on said sprockets, a casing for said chain and sprockets comprising an upper half and a lower half, means cooperating with the inside of said casing for lubricating the inside of the lower strand of said chain in such a manner that oil will not be promiscuously thrown about said casing comprising a disk mounted for rotation with one of said shafts and extending into the lower half of said casing, means for dividing the portion of said casing into which said disk extends to one side of said chain and sprockets into a lubricating compartment, and the portion of said casing beneath said chain and sprocket drive into an oil storage compartment having an oil level beneath the level of said chain so that oil in said storage compartment will not be churned by said chain and sprockets or disk during operation of the device, and means for regulating the passage of oil from said storage to lubricating compartments to limit the amount of oil in said lubricating compartment when the drive is running and feed a filtered, relatively cooled oil to said disk comprising an oil filtering member interposed between said compartments.

10. In an apparatus of the class described, a pair of shafts having sprockets thereon, a chain running on said sprockets, a casing for said chain and sprockets comprising an upper half and a lower half, means cooperating with the inside of said casing for lubricating the inside of the lower strand of said chain in such a manner as to preclude oil from being thrown promiscuously about the casing comprising a disk on one of said shafts for rotation therewith and extending into the lower half of said casing, means for dividing the portion of said casing into which said disk extends to one side of said chain and sprockets into a lubricating compartment, and the portion of said casing beneath said chain and sprocket drive into an oil storage compartment having a level beneath the level of said chain to preclude oil in said storage compartment from being churned by said chain and sprockets or disk during operation of the device, and means for regulating the passage of oil from said storage to lubricating compartments and feeding a filtered, relatively cooled oil to said disk comprising a passageway between said compartments spaced above the bottom of said storage compartment and having an oil filtering member therein.

11. In combination with a power transmission device including a pair of shafts having sprockets thereon and having a chain running on said sprockets, a casing for said chain and sprockets including a lower half having an oil storage compartment in its bottom in alignment with and beneath said chain and sprockets and a lubricating compartment to one side thereof, an oil conductor secured to the lower half of said casing leading to the inside of the lower strand of the chain and a disk on one of said shafts dipping into said lubricating compartment, a passageway between said compartments having an oil filtering member therein for regulating the extent to which said disk dips into the oil, means cooperating with said disk for transmitting oil onto said conductor comprising an upper half of said casing hinged to said lower half to open about either end thereof, the inner periphery of which upper half acts as an oil collecting member and means on the inner periphery of said casing for preventing oil from being thrown promiscuously thereabout comprising a radial deflecting member extending from the inner periphery of said casing below the top thereof towards said disk.

12. In a lubricating mechanism for chain drives, a pair of shafts having sprockets thereon, a chain running on said sprockets, a casing for said chain and sprockets, the lower portion of which forms an oil reservoir, a disk member on one of said shafts of larger diameter than its associated shaft and sprocket and dipping into said oil reservoir, and means for collecting the oil thrown centrifugally from said disk and depositing it on the lower strand of said chain comprising a conductor extending between the upper and lower strands of said chain, a collector extending upwardly therefrom and adapted to transmit the oil caught thereby to said conductor, an oil pocket on the opposite side of said disk adapted to receive the oil thrown to and running down the underside of said casing, and an oil transmitting member for transmitting the oil from said oil pocket to said conductor.

13. In a lubricating mechanism for chain drives, a pair of shafts having sprockets thereon, a chain running on said sprockets, a casing for said chain and sprockets, the lower portion of which forms an oil reservoir, a disk member on one of said shafts of larger diameter than its associated shaft and sprocket and dipping into said oil reservoir, and means for collecting the oil thrown centrifugally from said disk and depositing it on the lower strand of said chain comprising a conductor extending between the upper and lower strands of said chain, a radial deflecting member in the upper half of said casing and extending from the inner periphery thereof to a point closely adjacent said disk, and means for conducting the oil thrown centrifugally by said disk on the inner side of said casing from a point beneath said deflecting member to said conductor comprising an oil conducting member extending from a point beneath said deflector to said conductor.

14. In a lubricating mechanism for chain drives, a pair of shafts having sprockets thereon, a chain running on said sprockets, a casing for said chain and sprockets, the lower portion of which forms an oil reservoir, a disk member on one of said shafts of larger diameter than its associated shaft and sprocket and dipping into said oil reservoir, and means for collecting the oil thrown centrifugally from said disk and depositing it on the lower strand of said chain comprising a conductor extending between the upper and lower strands of said chain, a collector extending upwardly therefrom and adapted to transmit the oil caught thereby to said conductor, a deflector on the opposite side of said disk in the upper half of said casing and extending from the inner periphery thereof to a point closely adjacent said disk, and means for conducting the oil thrown centrifugally from said disk on the inner side of said casing beneath said deflector comprising an oil conducting member extending from said oil pocket to said conductor.

15. In an apparatus of the class described, a pair of shafts having sprockets thereon, a chain running on said sprockets, a casing enclosing said chain and sprockets including a lower portion and a detachable upper portion, an oil reservoir in a portion of the lower portion of said casing, a lubricating compartment disposed to one side of said oil reservoir, a passageway between said compartments, a disk on one of said shafts extending into said lubricating compartment, and means for restricting the amount of oil thrown by said disk and collecting said oil and depositing said oil on the inside of the lower strand of said chain comprising means in said passageway for regulating the flow of oil from said reservoir to said lubricating compartment, a conductor extending between the upper and lower strands of said chain, a collector extending upwardly therefrom on one side of said disk, a deflector on the opposite side of said disk, and an oil conducting member extending from a point beneath said deflector to said conductor.

16. In an apparatus of the class described, a pair of shafts having sprockets thereon, a chain running on said sprockets, a casing enclosing said chain and sprockets including a lower portion and a detachable upper portion, an oil reservoir in a portion of the lower portion of said casing, a lubricating compartment disposed to one side of said oil reservoir, a passageway between said compartments, a disk on one of said shafts extending into said lubricating compartment, and means for restricting the amount of oil thrown by said disk and collecting said oil and depositing said oil on the inside of the lower strand of said chain comprising means in said passageway for regulating the flow of oil from said reservoir to said lubricating compartment, a conductor extending between the upper and lower strands of said chain, a collector extending upwardly therefrom on one side of said disk, a deflector on the opposite side of said disk, and an oil conducting member disposed beneath said shaft having said disk thereon, said conducting member having upturned ends of greater elevation than the central portion thereof, one of the ends being disposed beneath said deflector for receiving oil running down the inside of said casing, and the other of said ends leading to said conductor.

CHARLES B. MORRISH.
WILLIAM H. REX, Jr.